US012451529B2

(12) United States Patent
Kim et al.

(10) Patent No.: US 12,451,529 B2
(45) Date of Patent: Oct. 21, 2025

(54) BATTERY MODULE FOR DETECTING SWELLING PHENOMENON THEREOF

(71) Applicant: SK INNOVATION CO., LTD., Seoul (KR)

(72) Inventors: Won Wook Kim, Seoul (KR); Dong Hun Lim, Gyeonggi-do (KR); Seung Hoon Ju, Daejeon (KR)

(73) Assignee: SK ON CO., LTD., Seoul (KR)

( * ) Notice: Subject to any disclaimer, the term of this patent is extended or adjusted under 35 U.S.C. 154(b) by 1171 days.

(21) Appl. No.: 17/342,340

(22) Filed: Jun. 8, 2021

(65) Prior Publication Data

US 2021/0296712 A1 Sep. 23, 2021

Related U.S. Application Data

(63) Continuation of application No. 14/747,568, filed on Jun. 23, 2015, now abandoned.

(30) Foreign Application Priority Data

Jun. 25, 2014 (KR) .................. 10-2014-0078337

(51) Int. Cl.
| | | |
|---|---|---|
| *H01M 10/48* | (2006.01) | |
| *H01M 10/42* | (2006.01) | |
| *H01M 50/209* | (2021.01) | |
| *H01M 50/264* | (2021.01) | |
| *H01M 50/271* | (2021.01) | |

(52) U.S. Cl.
CPC ......... *H01M 10/48* (2013.01); *H01M 10/425* (2013.01); *H01M 50/209* (2021.01); *H01M 50/264* (2021.01); *H01M 50/271* (2021.01); *H01M 2200/20* (2013.01)

(58) Field of Classification Search
CPC ........................... H01M 10/48; H01M 50/246
See application file for complete search history.

(56) References Cited

U.S. PATENT DOCUMENTS

| | | | | |
|---|---|---|---|---|
| 3,300,703 | A * | 1/1967 | Gold .................. | H01M 50/578 |
| | | | | 200/83 B |
| 2010/0068606 | A1* | 3/2010 | Matthias ............. | H01M 50/574 |
| | | | | 429/61 |
| 2013/0236751 | A1* | 9/2013 | Seong ................. | H01M 50/211 |
| | | | | 429/61 |
| 2014/0062418 | A1* | 3/2014 | Lim .................... | H01M 50/242 |
| | | | | 320/137 |

FOREIGN PATENT DOCUMENTS

KR 20130086581 A * 8/2013

* cited by examiner

*Primary Examiner* — Barbara L Gilliam
*Assistant Examiner* — Jordan E Berresford
(74) *Attorney, Agent, or Firm* — IP & T GROUP LLP

(57) ABSTRACT

A battery cell assembly includes a battery cell, a cartridge surrounding an edge of the battery cell and having insertion holes on opposite sides thereof, and a strap section disposed across one surface of the battery cell and having an elongated body part, fastening parts on opposite ends of the elongated body part, and a press pin protruding vertically from the elongated body part. A battery module capable of detecting swelling includes the plurality of battery cell assemblies.

7 Claims, 7 Drawing Sheets

BATTERY MODULE FOR DETECTING SWELLING PHENOMENON THEREOF

CROSS REFERENCE TO RELATED APPLICATION(S)

This application is a continuation of U.S. patent application Ser. No. 14/747,568 filed on Jun. 23, 2015, which claims the benefit of Korean Patent Application No. 10-2014-0078337, filed on Jun. 25, 2014, entitled "BATTERY CELL ASSEMBLY AND BATTERY MODULE FOR DETECTING SWELLING PHENOMENON THEREOF". The disclosure of each of the foregoing applications is incorporated herein by reference in its entirety.

BACKGROUND OF THE INVENTION

Field of the Invention

The present invention generally relates to a battery module for detecting a swelling phenomenon thereof.

Description of the Related Art

As well known in the art, secondary batteries are batteries that are capable of repeatedly performing charge/discharge so they are applicable as power sources for electric vehicles (EVs), hybrid electric vehicles (HEVs), or the like.

EVs or the like requiring high-power large-capacity batteries generally employ medium-large size battery modules. Such medium-large size battery modules include an angled or pouch cell that has high integration and low weight relative to capacity.

Such a medium-large size battery module is composed of a plurality of battery cell units comprising, for example, a pouch-type cell unit that has low weight, low possibility of leakage of an electrolyte, and relatively-low manufacturing cost.

The pouch-type cell unit has an electrolyte injected in a cell thereof, so that, if the cell is overcharged, a swelling phenomenon occurs in the cell so that internal voltage increases and the electrolyte is decomposed due to overheating, which causes a combustible gas to be generated in the cell and results in swelling of the pouch itself. Further, a separator membrane between an anode and a cathode may be fused so that the anode and cathode are short-circuited causing a fire. Thus, it impossible to ensure the stability of a pouch-type cell based on the conventional art.

To cope with this matter, a safety device for a secondary battery, which is disclosed in Patent Document 1, is provided with a switching device that is capable of preventing the swelling phenomenon that may cause explosion and/or combustion of the secondary battery from an increase in internal pressure of the battery under the circumstances of overcharge, short-circuit, and heat exposure. The switching device of Patent Document 1 includes a first secondary battery unit having a switch part on one side, and a second secondary battery unit having an operation-inducing part on the side opposite the switch part. When a swelling phenomenon occurs in the first and second secondary battery units, the switch part and the operation-inducing part come into contact so as to break a circuit, securing the stability of the secondary battery units.

However, the safety device of Patent Document 1 can break a circuit only when the switch part and the operation-inducing part are brought into reliable contact with each other. In a normal state, the safety device of Patent Document 1 should provide a predetermined distance between the secondary battery units in order to prevent the switch part and the operation-inducing part from coming into contact with each other.

DOCUMENT OF RELATED ART (Patent Document 1) Korean Patent Application Publication No. 10-2009-0047240

SUMMARY OF THE INVENTION

Accordingly, the present invention has been made keeping in mind the above problems occurring in the related art, and the present invention is intended to propose a battery module that is capable of cutting off electric current supplied to battery cell units of a battery cell assembly by turning on an overcharge protector when the battery cell assembly is swelled over a predetermined level.

In order to achieve the above object, according to one aspect of the present invention, there is provided a battery cell assembly including: a battery cell; a cartridge surrounding an edge of the battery cell and having insertion holes on opposite sides thereof; and a strap section disposed across one surface of the battery cell and having an elongated body part, fastening parts on opposite ends of the elongated body part, and a press pin protruding vertically from the elongated body part.

The press pin may have a socket part and a ball part, which are coupled to the elongated body part in a snap-fit manner or other coupling manners.

The socket part may have a recess in a lower surface thereof, and the ball part may have a protrusion to be inserted into the recess of the socket part.

The elongated body part of the strap section may have a through hole at a middle portion thereof, through which the protrusion of the ball part is to pass.

The press pin may be positioned at a middle portion of the elongated body part.

The fastening part of the strap section may include a first body portion having a downwardly-protruding wedge on a lower end thereof, and a second body portion fastening the first body portion to the elongated body part.

The elongated body part of the strap section may be made of an expandable and contractible material so as to be easily displaceable in response to swelling of the battery cell.

The elongated body part may be made of rubber capable of restorable to its original state.

According to another aspect of the present invention, there is provided a battery module capable of detecting swelling including: a plurality of battery cell assemblies stacked in an electrically-connected manner, wherein each battery cell assembly includes a battery cell and a cartridge surrounding the battery cell; a strap section disposed across one surface of the battery cell and having an elongated body part, fastening parts on opposite ends of the elongated body part, and a press pin protruding vertically from the elongated body part; an upper cover arranged on one outermost battery cell assembly among the plurality of battery cell assemblies, and having a guide tube guiding the movement of the press pin; a lower cover arranged on an opposite outermost battery cell assembly among the plurality of battery cell assemblies; and an overcharge protector disposed on an upper surface of the upper cover.

The guide tube may vertically protrude upwards from the upper cover to the overcharge protector.

The upper cover may have a through hole, through which the guide tube is disposed.

The upper cover may further include a seat for supporting and holding the overcharge protector.

The guide tube may further include a seal on an inner circumference to shield the interior of the battery module.

The seal may be formed from an elastic membrane material that is not affected by the pressing of the press pin.

The plurality of battery cell assemblies, the upper cover, and the lower cover may be fastened together by means of a fastening member. Here, the fastening member may be a long bolt.

The press pin is disposed under the guide tube. Specifically, the press pin, the guide tube, and the through hole of the upper cover may be aligned in a line.

The upper cover may have a through hole, through which the guide tube is disposed.

The strap section may be disposed on one surface of an outermost battery cell assembly.

The cartridge may have insertion holes on opposite sides thereof. The fastening part of the strap section is fixedly inserted into the insertion hole.

Features and advantages of the present invention will be further apparent to those skilled in the art when reading the following description in conjunction with the accompanying drawings.

It will be understood that terms used herein, such as those defined in commonly used dictionaries, should be interpreted as having a meaning consistent with their meaning in the context of the relevant art and the present disclosure, and will not be interpreted in an idealized or overly formal sense unless expressly so defined herein.

As set forth in the foregoing description, the present invention provides a battery module capable of immediately cutting off the current flowing through a circuit when a battery cell is overcharged and/or is swelled over a predetermined level, thereby improving the reliability of a battery cell assembly.

Since the battery module does not have a separate device between the battery cell assemblies, the battery module may be made thinner and lighter by closely stacking a plurality of battery cell assemblies.

Further, according to the present invention, a press pin provided on the battery cell assembly on the outermost side (uppermost and/or lowermost side, leftmost and/or rightmost side) may be securely guided onto an overcharge protector along with swelling of the battery cell.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a description will be made in detail of a battery module capable of detecting swelling of a battery cell assembly according to the present invention with reference to the accompanying drawings.

The advantages and features of the present invention, and a method for implementing the same will be apparent to those skilled in the art through the following embodiments and the accompanying drawings. In designating the elements of respective drawings with reference signs, like reference symbols refer to like elements throughout the description. Further, it is to be noted that, when the functions of conventional elements and the detailed description of elements related with the present invention may make the gist of the present invention unclear, a detailed description of those elements will be omitted.

Figure 1:
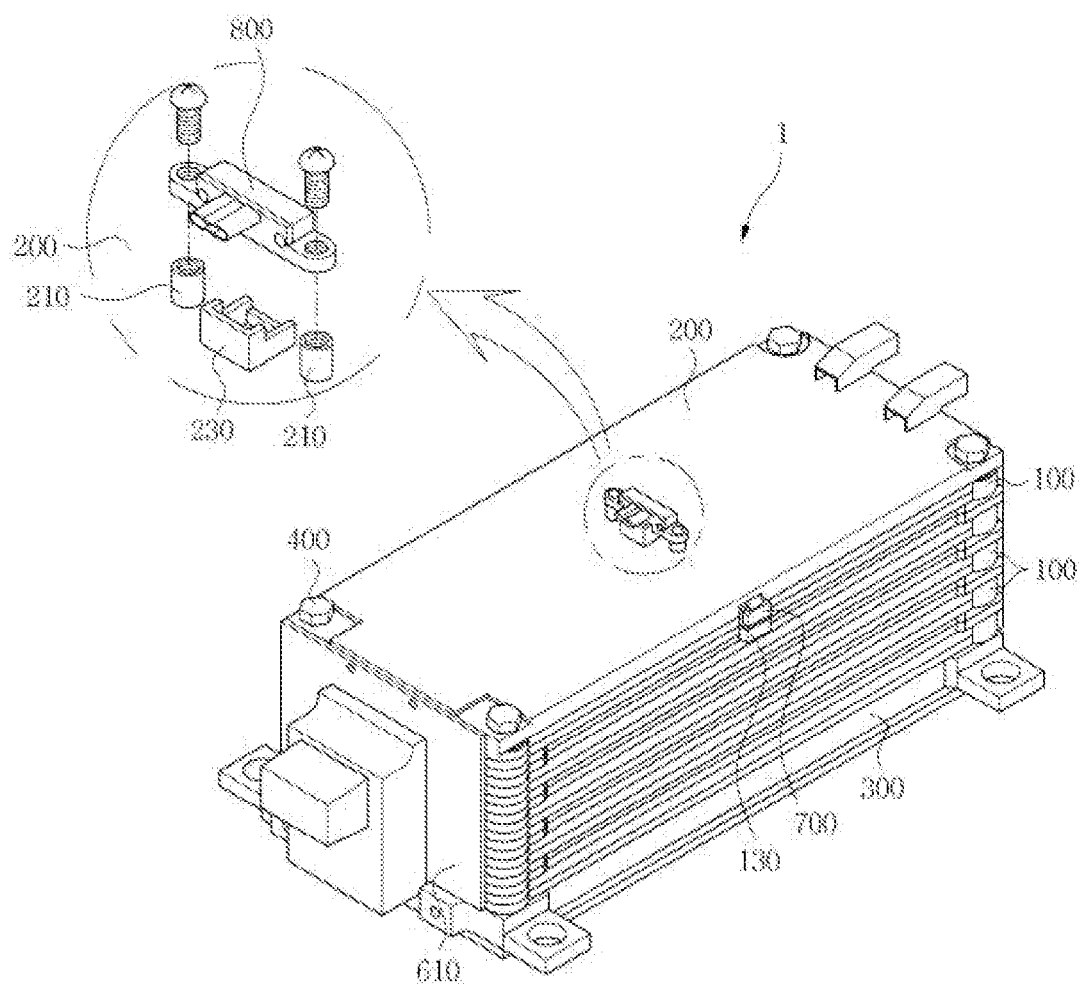
FIG. 1 is a schematic perspective view of a battery module for a secondary battery according to a preferred embodiment of the present invention.
Figure 2:
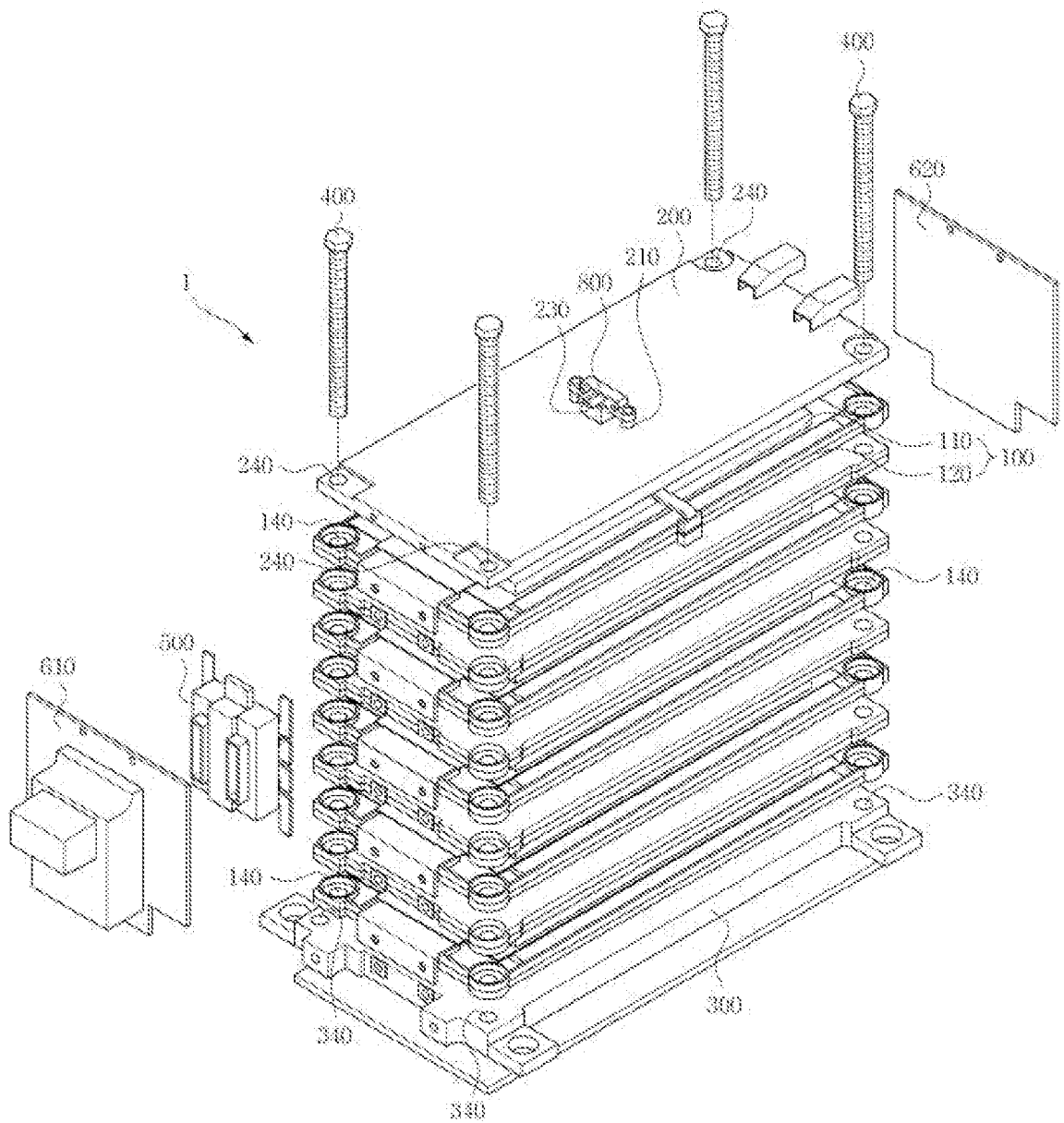
FIG. 2 is an exploded perspective view of the battery module shown in FIG. 1.

Referring to FIGS. 1 and 2, a battery module 1 according to a preferred embodiment of the present invention is designed to immediately cut off a circuit current when detecting an overcharge or abnormal swelling in a battery cell 110 installed in a cartridge 120 of a battery cell assembly 100.

The battery module 1 includes a plurality of battery cell assemblies 100, an upper cover 200 that covers an upper surface of an uppermost battery cell assembly 100 among the battery cell assemblies, a lower cover 300 that covers a lower surface of a lowermost battery cell assembly 100 among the battery cell assemblies, and a fastening member 400 that fixedly fastens the upper cover 200, the lower cover 300, and the battery cell assemblies between the upper and lower covers.

The battery cell assemblies 100 are stacked parallel with the lower cover 300 and are electrically connected together.

The fastening member 400 connects and fastens the upper cover 200, the cartridge 110 surrounding the edge of the battery cell assembly 100, and the lower cover 300 together, through holes 240, 140, and 340 of the upper cover, the cartridge, and the lower cover. Selectively, the fastening member 400 may be a long bolt.

The battery module 1 includes a front cover 610 for protecting a front portion of the stacked battery cell assemblies 100 and a rear cover 620 for protecting a rear portion of the stacked battery cell assemblies 100. A sensor unit 500 is disposed at the front portion of the stacked battery cell assemblies and is protected by the front cover. The sensor unit 500 is electrically connected with an overcharge protector (a connection, e.g., an electric wire, is omitted) so as to control charge and discharge of the battery cell 110. When overcharge or overdischarge occurs in the battery cell 110, the sensor unit detects it and cuts off a circuit, thereby extending a lifecycle of the battery module 1 and preventing explosion or combustion of the battery. Further, the sensor unit 500 may detect residual capacitance, temperature, or the like of the battery module 1 in real time.

Figure 3:
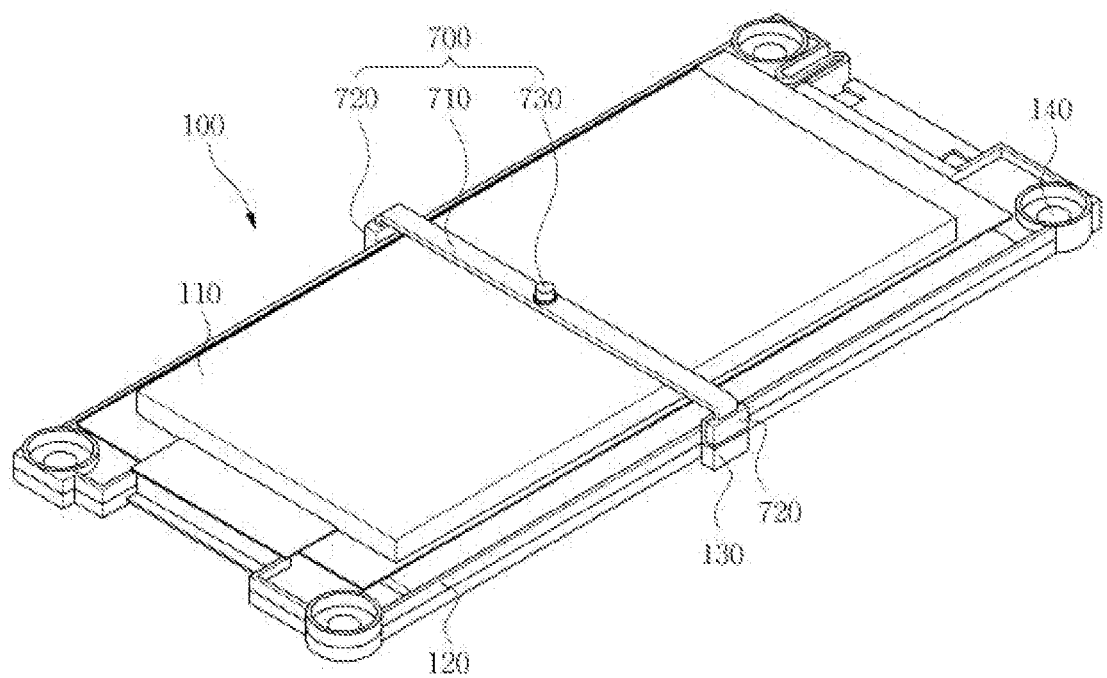
FIG. 3 is a top-side perspective view of battery cell assemblies of the battery module of FIG. 1.

The battery module 1 is provided with an overcharge protector 800 on the upper cover 200. The overcharge protector 800 may switch on or off via contact with a press pin 730 (FIG. 3).

The overcharge protector 800 is installed onto the upper surface of the upper cover 200 by mean of a fastening seat 210. The overcharge protector 800 may be connected with the fastening seat 210 in a screw-fastening manner or other fastening manners without limitation thereto.

The upper cover 200 is provided with a guide tube 230 on the upper surface. The guide tube 230 protrudes vertically from the upper surface of the upper cover 200, and the press pin 730 of a strap section 700 is reciprocated therethrough (see FIG. 5A). Selectively, the guide tube 230 is provided with a seal 231 on an inner circumference thereof in order to prevent the interior of the battery module 1 from being exposed to the outside through the guide tube 230. The seal 231 (FIG. 5A) may be composed of expandable and/or contractible elastic membrane.

Preferably, the guide tube 230 is installed around a through hole (not shown) of the upper cover 200 between the press pin 730 of the strap section 700 and the overcharge protector 800. That is, the press pin 730 of the strap section 700 installed to the battery cell assembly 100 disposed under the upper cover 200 is positioned under the guide tube 230. This ensures contact of the press pin 730 with a switch 810 of the overcharge protector.

FIG. 3 is a top-side perspective view of battery cell assemblies of the battery module of FIG. 1.

As shown, the battery cell assembly 100 includes the cartridge 120 and the battery cell 110 housed in the cartridge 120. The cartridge 120 is provided with corner holes 140.

The cartridge 120 is also provided with opposite side insertion holes 130. Preferably, the insertion holes 130 are provided at the middle portions of the opposite sides thereof.

The strap section 700 is installed to the cartridge 120 of the battery cell 110 of an uppermost (or lowermost) battery cell assembly. The strap section 700 is configured to displace upwards (or downwards) in response to swelling of the battery cell 100, which may occur due to an abnormal operation of the battery cell, resulting in a contact with the overcharge protector, thereby controlling a circuit.

The strap section 700 includes an elongated body part 710 extending across a surface of the battery cell 100, fastening parts 720 on opposite ends of the elongated body part 710, and the press pin 730 protruded from the elongated body part 710. The fastening parts 720 are fastened into the insertion holes 130 on opposite sides of the cartridge 120.

Preferably, the press pin 730 protrudes vertically from a middle portion of the upper surface of the elongated body part 710.

The elongated body part 710 of the strap section 700 may be made of a material, such as an elastic material, rubber or the like, that is capable of being bent in response to swelling of the battery cell 110 and being restorable to an original shape.

Figure 4:
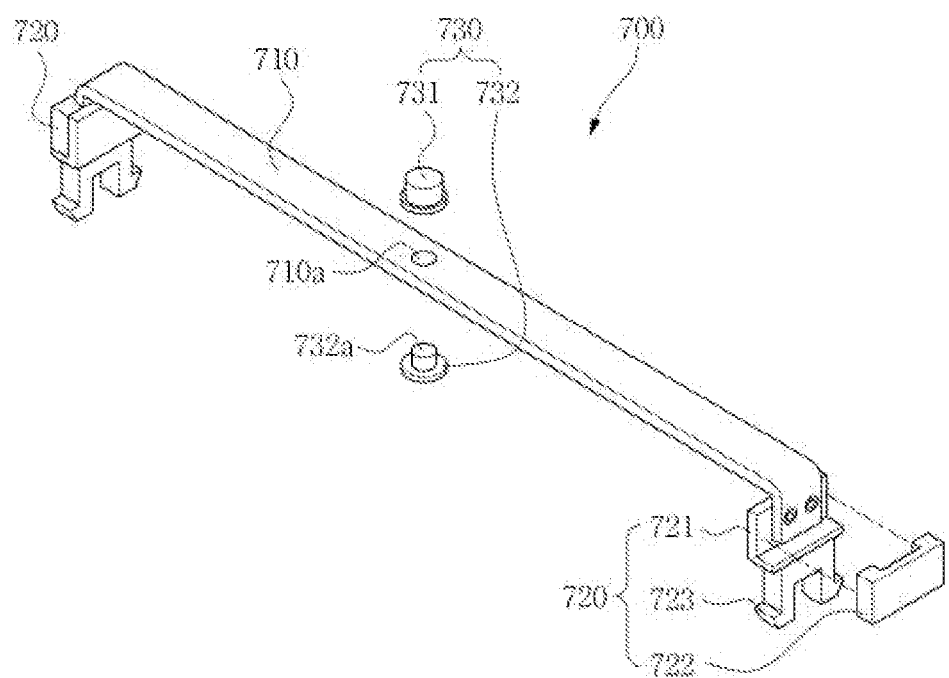
FIG. 4 is an exploded perspective view of a strap section.

FIG. 4 is an exploded perspective view of the strap section 700 disposed across the cartridge 120 of the battery cell assembly 100.

As described before, the strap section 700 includes the elongated body part 710, fastening parts 720 on opposite ends of the elongated body part 710, and the press pin 730 protruding from the upper surface of the elongated body part 710.

Specifically, the press pin 730 has a socket part 731 and a ball part 732, which are coupled in a snap-fit manner. The socket part 731 is an upper side part of the press pin 730 that is positioned at a middle portion of the upper surface of the elongated body part 710. The ball part 732 is a lower side part of the press pin 730 that is positioned at a middle portion of the lower surface of the elongated body part 710. Particularly, the ball part 732 has a protrusion 732a that is fixedly inserted into a recess 731a (see FIG. 5A) formed in the lower surface of the socket part 731 through a through hole 710a at the middle portion of the elongated body part 710. However, the present invention is not limited thereto, but the press pin 730 may be coupled at the elongated body part 710 by means of a variety of coupling methods other than the snap-fit coupling method.

As described above, the fastening parts 720 are disposed on opposite ends of the elongated body part 710 and are inserted into the insertion holes 130 (see FIG. 3). That is, the fastening parts 720 help coupling between the strap section 700 and the cartridge 120.

The fastening part 720 consists of a first body portion 721 and a second body portion 722, wherein the first body portion 721 has a downwardly-protruding wedge 723 on a lower end side thereof. The wedge 723 may be fixedly inserted into the insertion hole 130 of the cartridge 120. Since the wedge 723 consists of a two-part end, the wedge may be detachably inserted into the insertion hole 130.

Figure 5A:
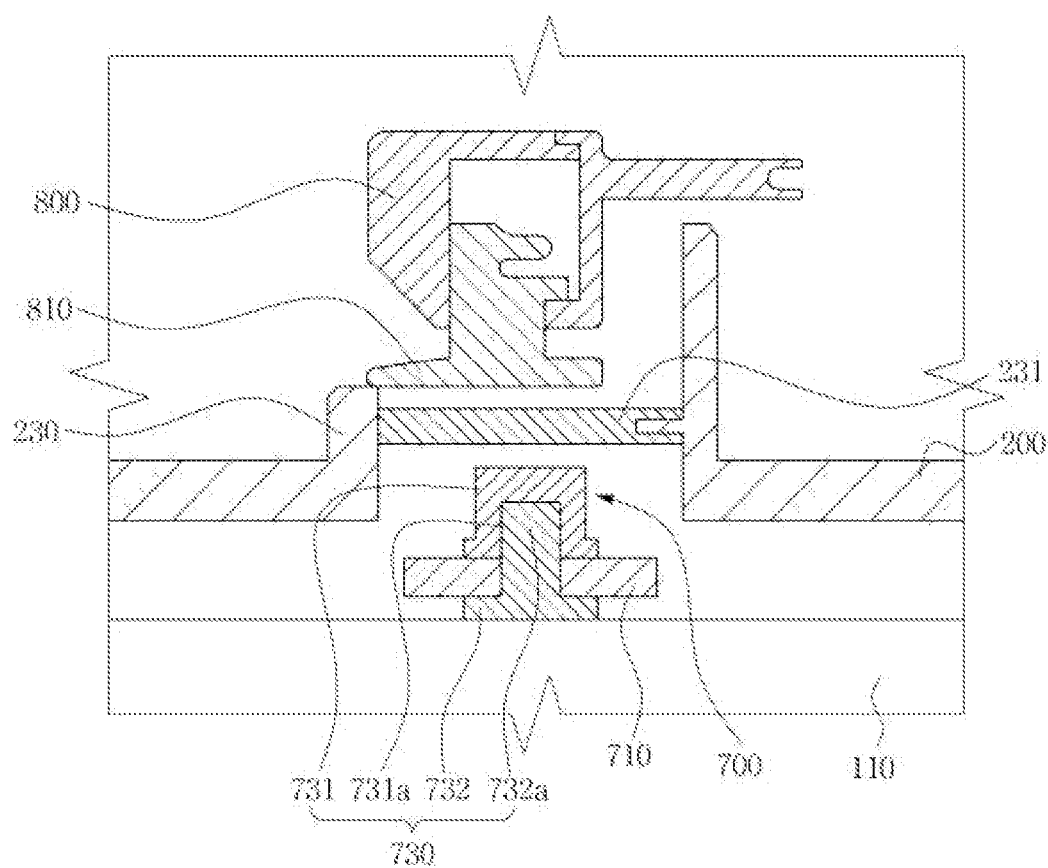
FIG. 5A is a cross-sectional view of a part indicated by a circle shown in FIG. 1.

FIG. 5A is a cross-sectional view of a part indicated by a circle shown in FIG. 1.

FIG. 5A shows the battery cell 110 that is charged or discharged in a normal state. In the figure, the battery cell 110 is not swelled, so the press pin 730 of the strap section 700 is located under the guide tube 230 of the upper cover 200 in a non-contact state with respect to the switch 810 of the overcharge protector 800, maintaining a switch-off state. This restricts the overcharge protector 800 being operated, allowing an easy charge/discharge of the battery cell 110 of the battery module. Particularly, according to a preferred embodiment of the present invention, a through hole (not shown) of the upper cover 200, the guide tube 230, and the press pin 730 are aligned in a line.

As described before, the guide tube 230 has the seal 231 therein in order to shield the interior of the battery module.

Figure 5B:
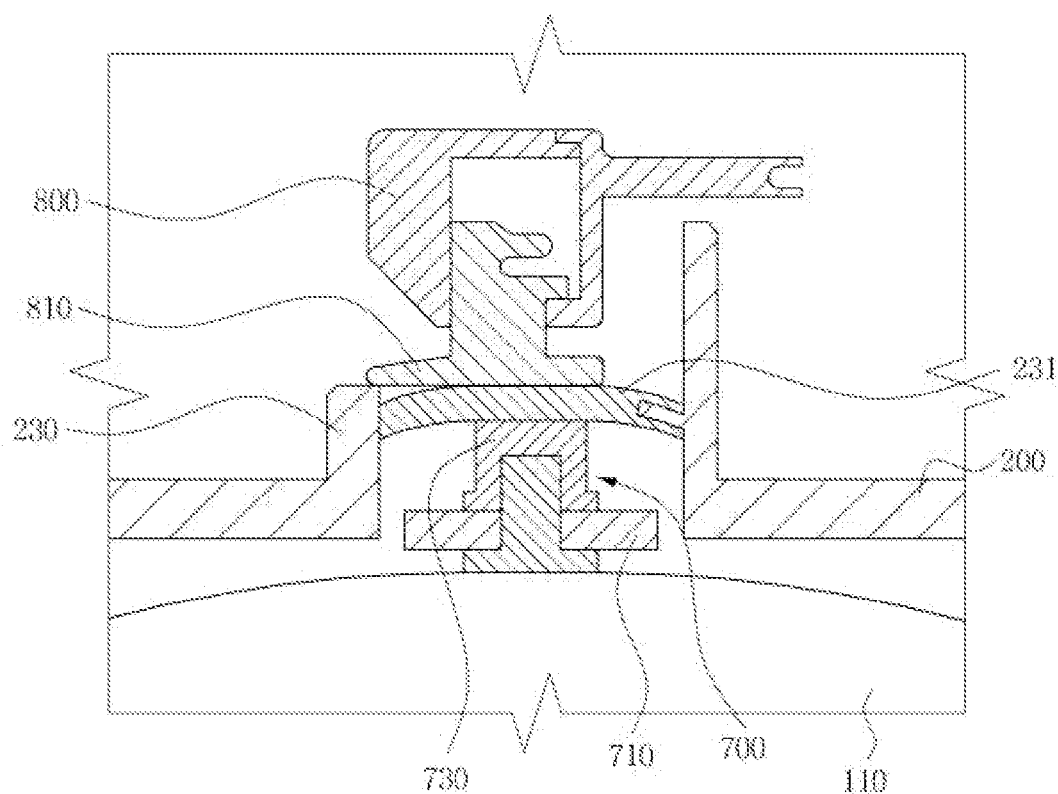
FIG. 5B is a cross-sectional view of the part indicated by the circle of FIG. 1, showing an overcharge protector being operated along with swelling of a battery cell assembly.

FIG. 5B is a cross-sectional view of the part indicated by the circle of FIG. 1, showing an overcharge protector being operated along with swelling of a battery cell.

As shown in the drawing, it can be known that the battery cell 110 has swelled. When the surface of the battery cell 110 expands as shown, the strap section 700 disposed on the surface of the battery cell 110 is vertically displaced. As a result, the guide pin 730 is moved up along the guide tube 230 and comes into contact with the switch 810 of the overcharge protector 800, maintaining a switch-on state. This enables the overcharge protector 800 to be operated, temporarily cutting off a circuit electrically connected to the battery cell 110. Further, in this process, the press pin is moved up and activates the overcharge protector 800 without breaking the seal 231 of the guide tube 230. Thus, the seal 231 may still shield the interior of the battery module from the external environment. Further, since the press pin 730 has an outer diameter smaller than an inner diameter of the guide tube 230, the press pin may be smoothly reciprocated.

Of course, when the battery cell 110 returns to its normal state as shown in FIG. 5A, the press pin 730 is moved back so as to make the switch 810 off, deactivating the overcharge protector 800.

Figure 6:
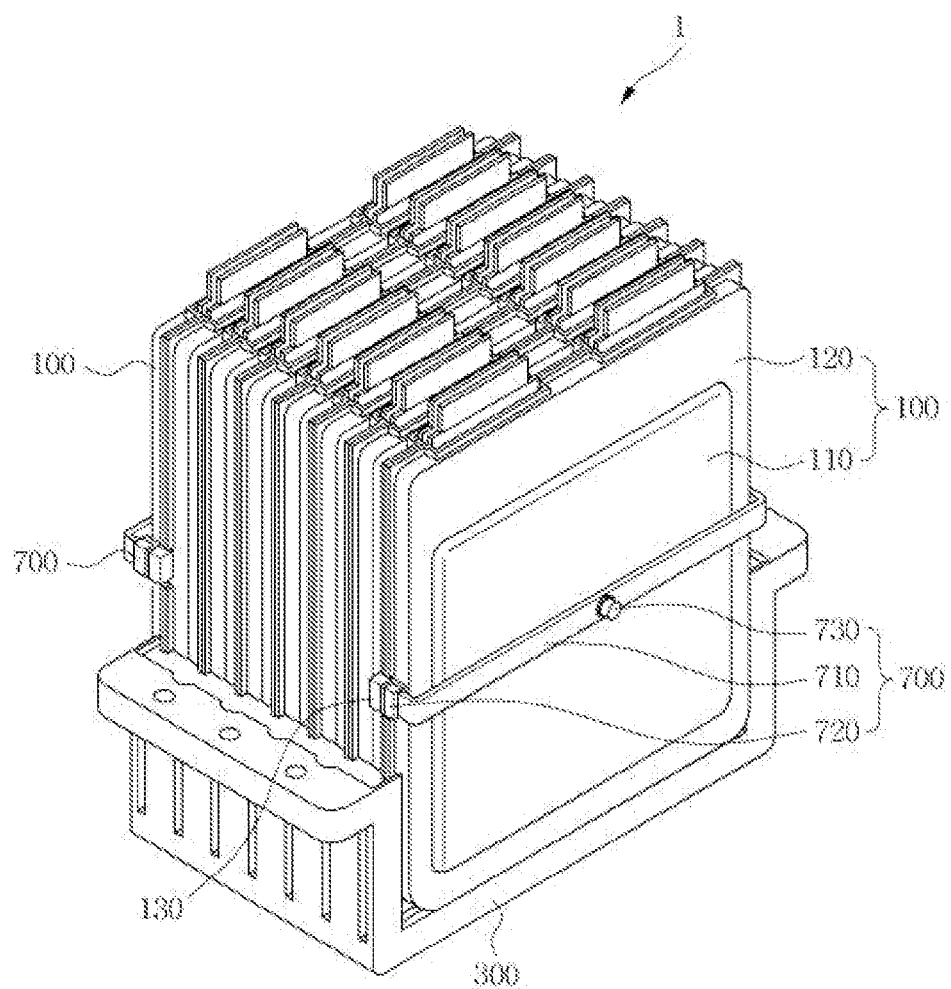
FIG. 6 is a schematic perspective view of a battery module for a secondary battery according to another embodiment of the present invention.

FIG. 6 is a schematic perspective view of a battery module for a secondary battery according to another embodiment of the present invention, wherein covers are removed in order to check the interior of the battery module. The battery module 1' of FIG. 6 has a similar structure to that of the battery module 1 of FIG. 2, except an arranging manner of the battery cell assemblies 100. Thus, a description for similar or identical components will be omitted for clear understanding of the present invention.

In the battery module 1', battery cell assemblies 100 are arranged in parallel in a direction perpendicular to the lower cover 300, i.e., a vertical direction. That is, in the battery module 1', a strap section 700 is installed on an outermost battery cell assembly, i.e., a leftmost battery cell assembly or a rightmost battery cell assembly opposite thereto. The strap section 700 serves to control a circuit by being displaced in the horizontal direction in response to swelling of the battery cell 110 of the battery cell assembly 100 and coming into contact with an overcharge protector (not shown).

Although a preferred embodiment of the present invention has been described for illustrative purposes, those skilled in the art will appreciate that various modifications, additions and substitutions are possible, without departing from the scope and spirit of the invention as disclosed in the accompanying claims.

Such modifications, additions and substitutions belong to the scope of the present invention, and the present invention is only defined by the scope of claims.

What is claimed is:

1. A battery module capable of detecting swelling comprising:
    a plurality of battery cell assemblies electrically connected and stacked on each other, each battery cell assembly including a battery cell and a cartridge surrounding an edge of the battery cell;
    an uppermost battery cell assembly among the plurality of the battery cell assemblies, the uppermost battery cell assembly including an uppermost battery cell and an uppermost cartridge surrounding an edge of the uppermost battery cell;
    an upper cover arranged on the uppermost battery cell assembly, the upper cover including a guide tube vertically protruding from an upper surface of the upper cover and having a hollow therein, wherein the upper surface of the upper cover faces away from the uppermost battery cell;
    an overcharge protector disposed on the guide tube,
    a strap section disposed over and across an upper surface of the uppermost battery cell, and positioned between the upper surface of the uppermost battery and the upper cover, the strap section has an elongated body part made of an elastically deformable material and disposed across the upper surface of the uppermost battery cell, and a press pin mounted on the elongated body part to reciprocate along the hollow of the guide tube between a contact position and a non-contact position with the overcharge protector; and
    a lower cover arranged on a lowermost battery cell assembly among the plurality of the battery cell assemblies.

2. The battery module according to claim 1, wherein the strap section is disposed in contact with the upper surface of the uppermost battery cell.

3. The battery module according to claim 1, wherein the uppermost cartridge has insertion holes on opposite sides thereof.

4. The battery module according to claim 3, wherein the strap section further has fastening parts provided at both ends of the elongated body part and inserted into the insertion holes of the uppermost cartridge.

5. The battery module according to claim 4, wherein the press pin is coupled to the elongated body part with a socket part positioned at an upper surface of the elongated body part and a ball part positioned at a lower surface of the elongated body part.

6. The battery module according to claim 1, wherein the guide tube includes a seal made of an elastic membrane material on a hollow cross section of the guide tube.

7. The battery module according to claim 1, wherein the plurality of the battery cell assemblies, the upper cover, and the lower cover are fastened together by means of a fastening member.

\* \* \* \* \*